Figure 1:
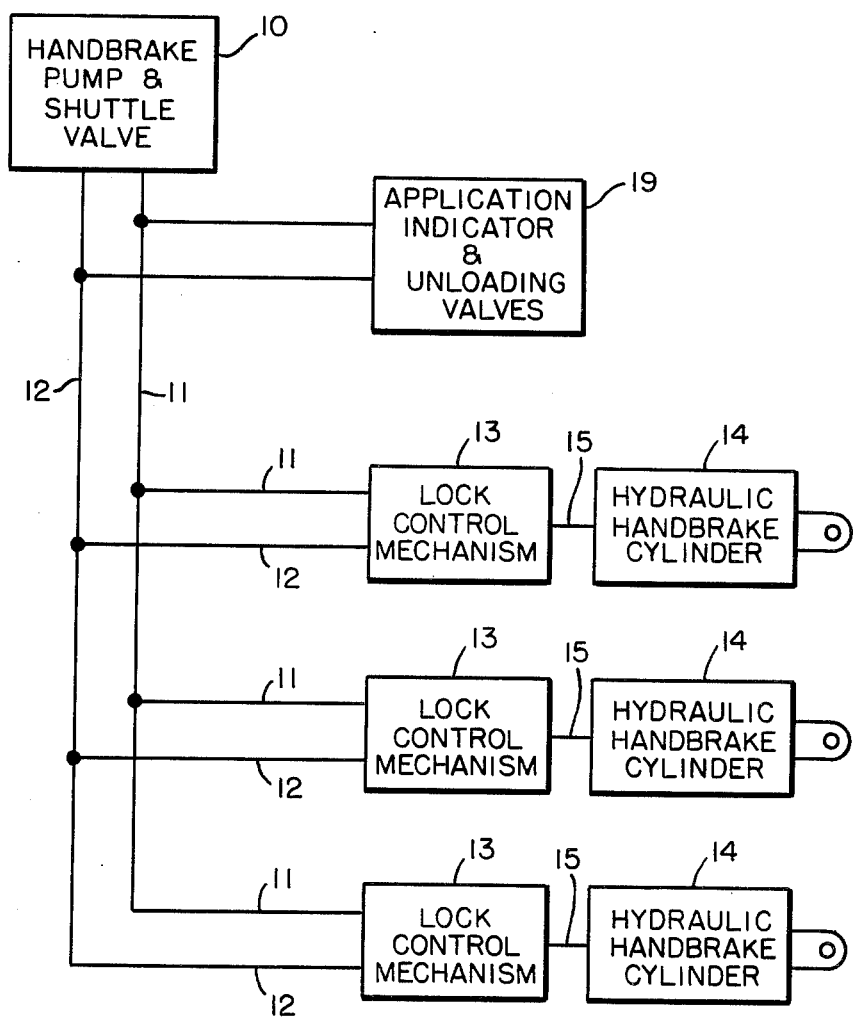

United States Patent [19]

Bogenschutz

[11] 4,168,865
[45] Sep. 25, 1979

[54] HYDRAULIC HANDBRAKE CONTROL SYSTEM

[75] Inventor: Thomas M. Bogenschutz, Clayton, N.Y.

[73] Assignee: General Signal Corporation, Stamford, Conn.

[21] Appl. No.: 851,074

[22] Filed: Nov. 14, 1977

[51] Int. Cl.$^2$ .............................................. B60T 17/16
[52] U.S. Cl. ........................................ 303/89; 60/442;
  91/44; 188/353
[58] Field of Search ................. 60/328, 436, 442, 474;
  91/44; 188/265, 353; 251/63.4, 63.5; 303/7, 10,
  13, 29, 75, 89

[56] References Cited

U.S. PATENT DOCUMENTS

| | | | |
|---|---|---|---|
| 2,637,416 | 5/1953 | Guernsey et al. | 188/353 |
| 3,025,871 | 3/1962 | Roth et al. | 251/63.4 X |
| 3,114,387 | 12/1963 | Barkan et al. | 251/63.4 X |
| 3,508,794 | 4/1970 | Engle | 303/10 |
| 3,622,207 | 11/1971 | Engle | 303/13 |
| 3,631,888 | 1/1972 | Anton et al. | 251/63.4 X |
| 3,707,309 | 12/1972 | Engle | 303/13 |
| 3,910,641 | 10/1975 | Engle | 303/7 |

*Primary Examiner*—Stephen G. Kunin
*Attorney, Agent, or Firm*—Jeffrey S. Mednick

[57] ABSTRACT

A hydraulic handbrake control system for vehicles has a hand operable reversible fluid pump and a shuttle valve operable to circulate fluid in one direction for applying vehicle handbrakes, and in another direction for releasing vehicle handbrakes by governing flow of fluid alternately in application and release directions over application and lock release passages connected to a plurality of hydraulic handbrake cylinders. An improved lock control mechanism is associated with each of the cylinders having a check valve permitting passage of fluid from the application passage to the associated brake cylinder, but preventing release of fluid when handbrakes are applied. A lock release cylinder is associated with each handbrake cylinder and connected to the lock release passage having a lock release plunger biased to normally open the check valve that is hydraulically operable in response to pressure in the application passage to permit closure of the check valve and in response to pressure in the lock release passage to open the check valve.

5 Claims, 2 Drawing Figures

HYDRAULIC HANDBRAKE CONTROL SYSTEM

REFERENCE TO PRIOR CASES

This invention is related to patents, assigned to the same assignee as the present application, of Thomas Engle Nos. 3,508,794, 3,622,207, 3,707,309 and 3,910,641, which are in part incorporated herein by reference.

BACKGROUND OF THE INVENTION

This invention relates to fluid handbrake control systems, and while the invention is subject to a wide range of applications, a preferred embodiment of the invention will be particularly described as applied to a hydraulic handbrake control system having an improved lock control mechanism.

It is common practice in braking systems for railway vehicles to provide hydraulic brake actuators on a vehicle that can at times be responsive to service brake control apparatus, and at other times responsive to hydraulic handbrake control apparatus. Such systems can be of the type disclosed, for example, in the Engle U.S. Pat. Nos. 3,508,794, 3,622,207, 3,707,309 and 3,910,641. The merging of the service and handbrake control systems, according to these patents, requires the use of special devices known as interceptor valves to jointly govern flow of hydraulic fluid to a brake cylinder common to both systems, in order to avoid undesirable characteristics as discussed in column 1 of the above U.S. Pat. No. 3,622,207. Another Engle U.S. Pat. No. 3,910,641 discloses such a system for an articulated carrier wherein a handbrake control mechanism on one of the sections of the vehicle governs the application of handbrakes on a plurality of sections of the vehicle. All of these patents require the brake cylinders to be of the type having hydraulically operated locks for governing mechanical locking of brake actuating mechanisms.

An object of the present invention is to provide a hydraulic handbrake control system which substantially obviates one or more of the limitations and disadvantages of the described prior art systems.

Another object of the present invention is to simplify hydraulic handbrake control systems by eliminating the need for mechanical locking of brake actuating mechanisms while maintaining safe handbrake control.

Another object of the present invention is to reduce the costs of hydraulic handbrake actuating mechanisms.

Other objects, purposes and characteristic features of the present invention will be in part obvious from the accompanying drawings, and in part pointed out as the description of the invention progresses.

SUMMARY OF THE INVENTION

A hydraulic handbrake control system for vehicles is provided comprising a hand operable reversible fluid pump and shuttle valve system operable to circulate fluid in one direction for applying vehicle handbrakes and in another direction for releasing vehicle handbrakes. Application and release of handbrakes is obtained by governing flow of fluid alternately in application and release directions over application and lock control passages respectively, connecting the fluid pump to a lock control mechanism associated with each of several hydraulic handbrake cylinders.

An improved lock control mechanism is provided comprising a check valve disposed in a connection of the application passage to each of the hydraulic handbrake cylinders independently for permitting passage of fluid from the application passage to the associated handbrake cylinder and for hydraulically locking the associated brake cylinder in a brake application position. The check valve is biased to permit flow of fluid from an application passage to the associated handbrake cylinder but to at times prevent flow of fluid from the handbrake cylinder to the application passage.

The improved lock control mechanism comprises a lock release cylinder for each handbrake cylinder connected to the lock release passage and having a lock release plunger normally biasing the associated check valve to an open position and hydraulically operable to remove the bias during hand brake application and to open the check valve in response to operation of the fluid pump in a direction for releasing the handbrakes. This provides that leakage of fluid from one handbrake cylinder when the handbrakes are applied will not release fluid from another handbrake cylinder, thus assuring that adequate braking can be maintained by the handbrake control system over a period of time, although there may be material leakage in one or more, but not all of the handbrake cylinders.

For a better understanding of the present invention, together with other and further objects thereof, reference is had to the following description, taken in connection with the accompanying drawings, while its scope will be pointed out in the appending claims.

IN THE DRAWINGS

Figure 2:
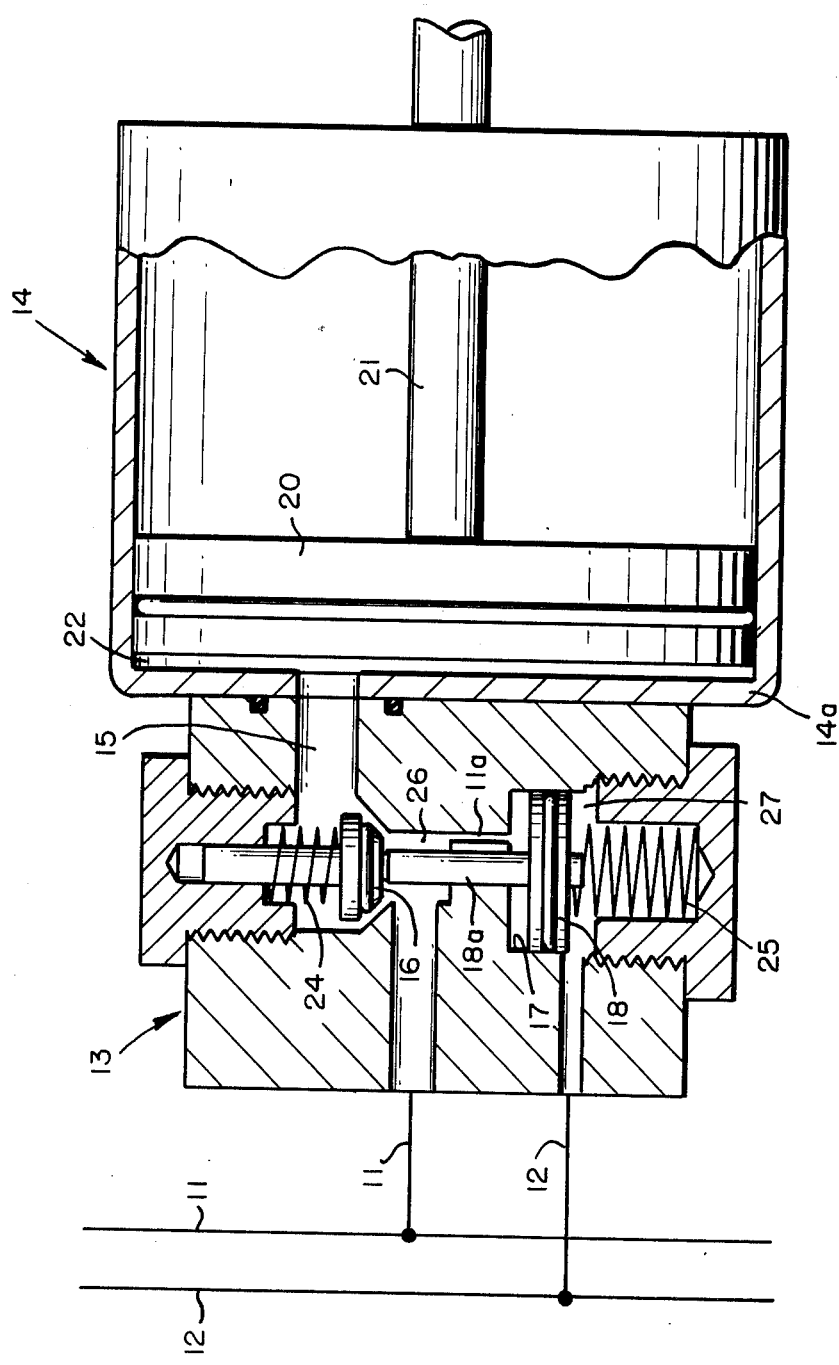

FIG. 1 is a block diagram illustrating a hydraulic handbrake control system for vehicles according to a preferred embodiment of the present invention; and FIG. 2 is an elevational view, partly in cross section, illustrating apparatus provided for lock control of a typical hydraulic handbrake cylinder shown in FIG. 1.

With reference to FIG. 1, a handbrake and associated pump and shuttle valve apparatus is illustrated at 10 operable to circulate fluid in one direction for applying vehicle handbrakes and in another direction for releasing vehicle handbrakes by governing flow of fluid alternately in application and release directions over application and release passages 11 and 12 respectively which have multiple passages connected to lock control mechanisms 13, which are in turn connected to associated hydraulic handbrake cylinders 14 by fluid passages 15.

With reference to FIGS. 1 and 2, each lock control mechanism 13 is illustrated in the preferred embodiment of the invention as being secured on the left-hand end 14a of its associated hydraulic handbrake cylinder 14 and connected thereto by a fluid passage 15. Each of the lock control mechanisms has a check valve 16 provided for permitting fluid flow between the handbrake pump 10 and the associated hydraulic handbrake cylinder 14 through passage 15, but at times for restricting flow of fluid from the associated handbrake cylinder to the handbrake pump 10. Each of the lock control mechanisms also comprises a lock release cylinder 17 and associated lock release piston 18 and lock release plunger 18a for normally biasing the check valve 16 to an open position and hydraulically operable to remove the bias during handbrake application and to open the check valve 16 in response to operation of the fluid pump apparatus 10 in a direction for releasing the handbrakes by applying pressure to passage 12.

Application indicator and unloading valve apparatus 19 is preferably connected across the passages 11 and 12 for providing a visual indication that the brakes are applied, and for causing an operator to sense completion of operation of the handbrake by unloading fluid pressure selectively in the passages 11 and 12.

Having thus considered the general organization of this system, further consideration will be given as to the more detail structure that can be provided.

With reference to FIG. 2, each hydraulic handbrake cylinder 14 and its associated lock control mechanism 13 is illustrated in its normal positions in which the handbrakes are released, a brake operating piston 20 having been operated to its left-hand position, thus causing its piston rod 21 to have released the associated brakes (not shown). Under these normal conditions, the hydraulic passages 11 and 12 are both at substantially atmospheric pressure as well as chamber 22 at the left of piston 20 in the hydraulic handbrake cylinder 14, and the check valve 16 is maintained in its normally open position by reason of lock plunger 18a holding the check valve 16 in its open position. This is accomplished as a result of bias on check valve 16 of opposing coaxial springs 24 and 25 having their relative forces chosen so that the force of the spring 25 overcomes the force of the spring 24 normally to an extent for maintaining the check valve 16 normally open. This permits free movement of fluid through the check valve normally to insure that fluid in the associated hydraulic handbrake cylinder is normally substantially at atmospheric pressure, but permits the immediate closing of the check valve 16 upon application of the handbrakes, when input pressure in the application passage 11 acts, through a small passage 11a to compress a spring 25 and remove the bias holding check valve 16 open. Thus, for example, the spring 25 can be an 8 pound spring as compared to the spring 24 being a 4 pound spring to normally hold check valve 16 open, the spring 25 being compressed when pressure is applied from passage 11a and application passage 11 to a release piston 27 in order to permit the closure of the check valve 16 by its spring 24. Therefore, upon initiation of application of the handbrake, the lock control mechanism becomes effective to prevent release of fluid from the associated handbrake cylinder 14.

With reference to FIG. 1, the handbrake pump and shuttle valve 10 can be provided as is fully disclosed in FIG. 4 of the above Engle U.S. Pat. No. 3,910,641. The application indicator and loading valves 19 of FIG. 1 can be provided, for example, as is disclosed at 17 in the above-mentioned Engle U.S. Pat. No. 3,508,794.

To consider the mode of operation it will first be assumed that the system is in its normal condition in which the handbrake is released, as is illustrated in the drawings, and it will further be assumed that an operator actuates the handbrake 10 to drive an associated pump, which can be of the positive displacement type, in a direction to apply pressure to the application passage 11. This causes hydraulic fluid to flow over passage 11 through a chamber 26 in each lock control mechanism 13 to the chamber 22 to the left of piston 20 in the associated hydraulic handbrake cylinder 14. This actuates the piston rods 21 to the right to apply the brakes (not shown). When proper brake pressure has been built up in the handbrake cylinder chambers 22, a pressure relief unloading valve 19 is actuated to bypass application passage fluid to return passage 12, and thereby relieve pumping pressure that has been developed by the handbrake operator so that the operator senses the completion of operation of the brakes to their application positions. He can then stop actuation of the pump, and the pressure built up in chambers 22 of the hydraulic handbrake cylinders 14 causes the closing of the check valves 16 of the associated lock control mechanism 13.

When it is desired to release the handbrake, the handbrake operator reverses the drive of the pump 10, which actuates the associated shuttle valve to apply pressure in the release passage 12, which is connected to release chambers 27 in the lock control mechanisms 13, for actuating the release pistons 18 and their associated release piston rods 18a against the associated check valves 16 to open the check valves 16 and release fluid in the hydraulic handbrake chambers 22 to atmospheric pressure via return passage 11. At a pressure slightly higher than the pressure in passage 12 that is required to open the check valves 16, a relief valve in the application indicator and unloading valves 10 become actuated, and an indicator piston (not shown) is restored to its normal position to uncover a passage for fluid from passage 12 to atmospheric pressure in passage 11, thus unloading the handbrake and causing the operator to sense that his release of the handbrake has been completed. This mode of operation, for example, is disclosed in detail in the above-mentioned Engle U.S. Pat. No. 3,508,794.

One use for a handbrake system such as is disclosed by the present invention, can be to provide handbrakes on an articulated carrier vehicle having several coupled sections, wherein a hydraulic handbrake cylinder can be provided for operation of vehicle brakes on each of several of the articulated sections, all controlled from a single hand operated pump 10 on one of the sections. This system can thus be used in connection with a conventional fluid braking system that can be either pneumatic or hydraulic in accordance with the requirements of practice. The hydraulic handbrake cylinders 14 can be used to actuate the same brake beams, for example, that are actuated by a conventional fluid brake control system.

Having thus described a hydraulic handbrake control system for a vehicle having improved lock control mechanisms associated with the respective handbrake cylinders, as a preferred embodiment of the present invention, it is to be understood that various modifications and alterations may be made to the specific embodiment shown without departing from the spirit or scope of the invention.

What is claimed is:

1. A hydraulic handbrake control system for vehicles comprising hand operable reversible fluid pump means and a shuttle valve, operable to circulate fluid in one direction for applying vehicle handbrakes and in another direction for releasing vehicle handbrakes by governing flow of fluid alternatively in application and release directions over application and lock release passages to a plurality of hydraulic handbrake cylinders, and a lock control mechanism associated with each of the cylinders, wherein an improved lock control mechanism comprises, (a) check valve means having a check valve disposed in a connection of the application passage to each of the handbrake cylinders independently for permitting passage of fluid from the application passage to the associated brake cylinder and for hydraulically locking the associated handbrake cylinder in a brake application position, (b) lock control cylinder means for each of the handbrake cylinders governed jointly by fluid in the application and lock release passages and in the associated handbrake cylinder for governing the locking of fluid in the handbrake cylinders,
  (1) said lock control cylinder means having a lock release plunger for maintaining the associated check valve in an open position when the hand operable fluid pump is in its normal position and fluid pressure has been released from the associated handbrake cylinder,
  (2) said lock control cylinder means permitting the associated check valve to close when pressure is applied through the application passage to the handbrake cylinder,
  (3) said lock control cylinder means being effective to open the check valve in response to pressure in the lock release passage to permit release of pressure in the associated handbrake cylinder, and
  (4) said lock control cylinder means having means for biasing the lock plunger comprising a spring, generating a force operable to overcome an opposing bias of the associated check valve to normally maintain the check valve open when the handbrakes are released,
(c) whereby leakage of fluid from one handbrake cylinder when the handbrakes are applied will not release fluid from another handbrake cylinder.

2. A hydraulic handbrake control system according to claim 1 wherein the means for biasing the check valve and the means for biasing the lock release plunger are opposing coaxial check valve and lock release plunger springs respectively disposed on opposite sides of the check valve, the lock release plunger spring being normally effective to overpower the check valve spring to maintain the check valve open when the handbrake is released.

3. A hydraulic handbrake control system according to claim 2 wherein means is provided for compressing the spring biasing the release plunger in response to fluid pressure in the application passage to permit the check valve to close.

4. A hydraulic handbrake control system according to claim 3 wherein the lock control mechanism is secured to one end of its associated hydraulic handbrake cylinder.

5. A hydraulic handbrake conrol system according to claim 1 wherein an application indicator and unloading device is connected to the application and lock control passages for indicating the application of the handbrake and causing an operator to sense completion of handbrake operation by unloading fluid pressure in the passages.

* * * * *